United States Patent [19]
Feichtinger

[11] 3,768,301
[45] Oct. 30, 1973

[54] ARRANGEMENT FOR DETERMINING THE THERMAL CONDUCTIVITY OF GASES

[76] Inventor: Heinrich Feichtinger, Schaffhausen, Switzerland

[22] Filed: Nov. 23, 1971

[21] Appl. No.: 201,480

[30] Foreign Application Priority Data
Nov. 25, 1970 Switzerland.................. 17488/70

[52] U.S. Cl............................................... 73/27 R
[51] Int. Cl. ............................................. G01n 27/18
[58] Field of Search............................ 73/27 R, 204

[56] References Cited
UNITED STATES PATENTS
3,474,660  10/1969  Dooley................................... 73/27
3,621,707  11/1971  Kolloff et al........................... 73/27
3,592,058  6/1971   Benson et al.......................... 73/204
3,304,778  2/1967   Stuart.................................... 73/189
2,010,995  8/1935   Jacobson................................ 73/27
3,106,088  8/1963   Kieselbach............................. 73/27

Primary Examiner—Herbert Goldstein
Attorney—Joseph F. Padlon

[57] ABSTRACT

An arrangement for measuring the thermal conductivity of a gas in which a temperature sensor is held within a duct oriented perpendicular to a plurality of smaller ducts carrying the gas to be subjected to the measurement. The plurality of gas ducts intersect the duct carrying the temperature sensor, in a tangential manner, so that a whirl of the gas is created along the wall of the duct carrying the temperature sensor, while the zone in immediate proximity to the gas has substantially stagnant gas.

8 Claims, 6 Drawing Figures

PATENTED OCT 30 1973　3,768,301

INVENTOR.
Heinrich Feichtinger
BY Joseph F Paillon

ATTORNEY

ARRANGEMENT FOR DETERMINING THE THERMAL CONDUCTIVITY OF GASES

BACKGROUND OF THE INVENTION

The present invention relates to a measuring cell or instrument for determining the thermal conductivity of gases, through the use of a heat or temperature sensor held within a bore.

The present invention differs from arrangements of the preceding species, known in the art, by providing that the gases to be investigated or tested, are passed through bores or tube-shaped openings having diameters which are smaller than the diameter of the bore in which the temperature sensor is held. The axes of the tube-shaped openings through which the gases to be investigated are passed, are perpendicular to the axis of the axis of the bore holding the temperature sensor. The tubes with the gases to be investigated, furthermore, intersect the bore containing the temperature sensor, in a tangential manner, so that the gas containing tube-shaped openings intersect or interfere substantially with the outer surface of the bore containing the temperature sensor.

It is known in the art, to apply different methods of investigation or measurements for determining the composition of gases by measuring the thermal conductivity of gases and gas mixtures, as for example, in the art of gas chromatography. In these methods for determining the composition of gases, the gases are conducted over a heated temperature sensor. The temperature sensor then becomes cooled to a degree dependent upon the composition of the gas. Thus, the temperature sensor will become cooled more or less, as a function of the composition of the gas passed over the sensor. As a result of the change in temperature, the sensor undergoes a corresponding change in resistance. The variation of the resistance serves an an indication or measurement of the temperature variation, and accordingly, this variation in the resistance also serves as an indication or measurement of the variation in the gas composition.

In a number of methods, known in the art, the gases are passed directly over a heated measuring element in a gas flow cell, as shown in FIG. 4. Such cells have the advantage that they are rapidly responsive and sensitive to variations in the gas composition. These cells of FIG. 4, however, have the disadvantage that they respond to every slight variation in the flow rate or velocity of the gas stream 7-8. By being thus responsive or sensitive to variations in the velocity of flow rate of the gas stream, measuring errors are incurred. In the past, attempts were made to avoid such errors by providing for the design of FIG. 5, in which the gas flow 7-8 is passed through a bore communicating with a transverse bore 13 leading to a closed chamber 2 containing the temperature sensor 1. In this arrangement of FIG. 5, gas would enter the chamber 2 from a bore 13, only as a result of a diffusion process. Whereas the cell design of FIG. 5 will be substantially insensitive to variations in the velocity or flow rate of the gas, this arrangement will not respond rapidly to variations in gas composition due to substantial time lag associated with the design of this arrangement.

In the attempt to avoid the disadvantage of the design of FIG. 5, the arrangement of FIG. 6 was introduced, heretofore. In this arrangement, two substantially arrow channels or openings 14 and 15 were provided for the passage of gas from the main stream 7-8. After passage of a portion of the gas from the main stream through the bores or openings 14 and 15, the gas would enter the chamber 2 containing the temperature sensor 1. From the design of FIG. 6, it is evident that the larger the openings 14, 15 are for admitting a larger portion of the gas to the chamber 2, the more closely the arrangement of FIG. 6 approaches the flow measuring cell of FIG. 4. As a result, the disadvantages associated with FIG. 4 are incurred, namely sensitivity to changes in the velocity or flow rate. If, on the other hand, the openings 14, 15 are made smaller so that substantially less gas is admitted to the chamber 2, the design of FIG. 6 approaches more closely the arrangement of FIG. 5 which has the disadvantage of being too insensitive with associated time lags.

The novel features which are considered as characteristic for the invention are set forth in particular in the appended claims. The invention itself, however, both as to its construction and its method of operation, will be best understood from the following description of specific embodiments when read in connection with the accompanying drawing.

SUMMARY OF THE INVENTION

It is an object of the present invention to provide an arrangement for measuring the thermal conductivity of gases by avoiding the disadvantages, as set forth.

It is another object of the present invention to provide an arrangement for measuring the thermal conductivity of gases which are simple in design and may be readily fabricated.

A still further object of the present invention is to provide an arrangement of the foregoing character, which may be economically maintained. The objects of the present invention are achieved by providing an arrangement in which the gas to be measured for its thermal conductivity, is passed through a plurality of tube-shaped openings or bores which are perpendicularly oriented with respect to the axis of a bore containing a temperature sensor. The tube-shaped openings containing the gas to be measured, intersect tangentially the outer surface of the bore containing the sensor. The intersection is such that substantial interference prevails between the tube-shaped openings and the bore containing the temperature sensor.

DESCRIPTION OF THE PREFERRED EMBODIMENTS

Figure 1:
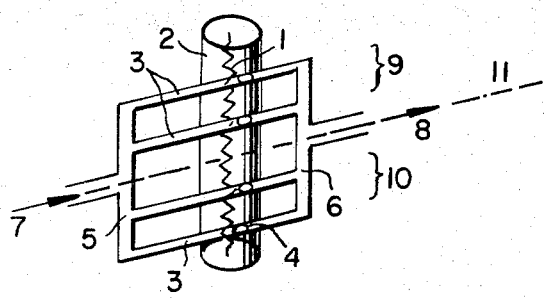
FIG. 1 is a diagrammatic view of the arrangement for determining the thermal conductivity of gases, in accordance with the present invention.
Figure 3:
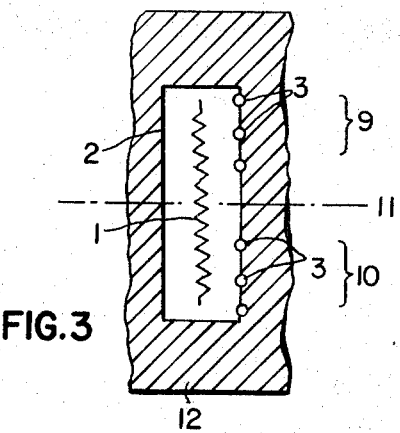
FIG. 3 is a partial sectional view in a plane passing through the line 11 in FIG. 1.
Figure 2:
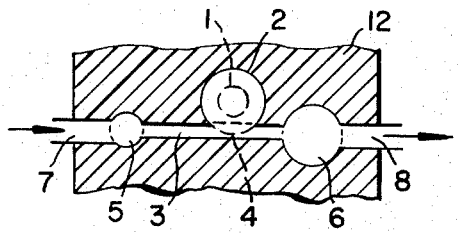
FIG. 2 is a sectional plan view of the arrangement of FIG. 1.
Figure 4:
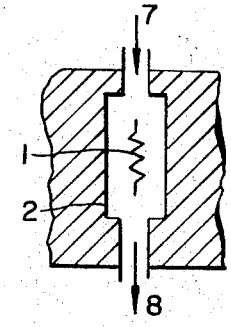
FIGS. 4 to 6 are partial sectional views of conventional measuring cells.
Figure 5:
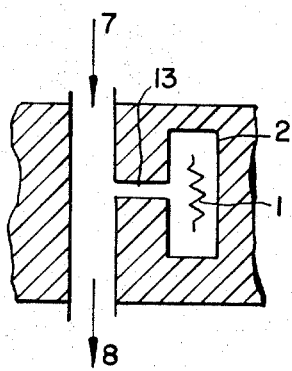
Figure 6:
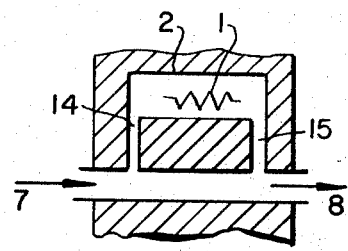

Referring to the drawing and in particular to FIG. 1, the gases to be investigated or tested are passed through substantially narrow bores or openings 3, which are oriented perpendicular to the bore 2 containing the temperature sensor 1. The openings or bores 3 intersect the bore 2 in a tangential manner, so that curved openings 4 result. These curved openings 4 are shown in FIG. 2. The bores 3 are tube-shaped openings which are substantially smaller in diameter than the bore 2 containing the temperature sensor. As a result of the perpendicular intersection of the bore 3 with the bore 2, a predetermined whirling effect takes place with substantially large velocity against the outer wall of the bore 2. This whirling effect of the gas transmitted from the tubes 3 to the bore 2, however, takes place mainly against the outer wall of the bore 2, and is substantially confined to this region. Substantially no flow effects take place within the interior zone of the bore 2 where the temperature sensor 1 is held in place.

In accordance with the present invention, an ideal construction is obtained, in which the varying gas composition is continuously moved in an exchanging manner over a maximum surface which subjects the gases to the measurement of the temperature sensor. At the same time, however, in the particular zone in which the temperature sensor is located, substantially no gas motion or gas velocity prevails, so that the temperature sensor 1 is not affected by variations in the velocity of the gases. Thus, any variations in the gas stream 7-8 are substantially immediately passed into the bore 2 as a result of the tangential intersection and the high velocity whirl created by this construction. This high velocity whirl, however, is confined to the outer portion of the bore 2, and the inner zone or portion of this bore 2 is not substantially subjected to the whirling effects of the gases. Consequently, the temperature sensor 1 is located within an environment which is not subjected to gas streams of substantial velocity, so that the velocity errors in the measurement by the temperature sensor 1, are not incurred.

In a preferred embodiment of the present invention, the bore 2 has a diameter within the range of 5 to 6 mm, and an axial length within the range of 18 to 30 mm. The tangential transverse bores 3 have a diameter from 1.2 to 2.2 mm. These bores 3 are, at the same time, distributed in this embodiment so that 3 bores are located in the upper half of the bore 2, and within the zone 9, whereas 3 other bores 3 are located along the lower half, within the zone 10. The gas stream 7 communicates with a transverse bore 5 which functions as a distributing bore for the openings or bores 3. The transverse bore 5 has a diameter of, for example, 2 to 4, mm, and communicates with the bores 3. The axes of the bores 3 pass by the chamber 2 in a tangential manner through openings 4, and are then collected again through a receiving duct or bore 6 which communicates with the other ends of the bores 3. A diameter of the receiving bore or duct 6 is advantageously made larger than the diameter of the bore 5, and is, for example, 3 to 6 mm in diameter. The inlet 7 and outlet 8 are located along the axis 11, and are symmetrically situated between zones 9 and 10.

In another preferred embodiment of the present invention, the bore 2 has a diameter of 8 to 15 mm, and an axial length of 10 to 20 mm. The tangential transverse bores 3 have a diameter of 1.8 to 3 mm, and two of the bores 3 are located in the upper zone 9, whereas two further bores 3 are located within the lower half of zone 10. 10. The inlet 7, in this embodiment, communicates with the transverse bore 5 from which the two pairs of bores 3 lead in a symmetrical manner. At the other end, the bores 3 communicate with a common transverse bore 6 leading to the outlet 8. The axis 11 is, furthermore, symmetrically located between the zones 9 and 10. The temperature sensor and the different bores are located within a metallic block member 12.

It will be understood that each of the elements described above, or two or more together, may also find a useful application in other types of gas measuring apparatus from the types described above.

While the invention has been illustrated and described as embodied in gas measuring apparatus, it is not intended to be limited to the details shown, since various modifications and structural changes may be made without departing in any way from the spirit of the present invention.

What is claimed is:

1. An arrangement for measuring the thermal conductivity of gases comprising, in combination, duct means confining said gas to flow along a predetermined path; cylindrical bore means located substantially perpendicular to and communicating with said duct means; temperature sensing means enclosed within the interior zone of said bore means, said duct means comprising at least two transverse ducts each duct intersecting said bore means tangentially and at a point remote from the ends of each duct, said ducts in pairs distributed along said bore means, the gas molecules of each stream from said ducts travelling within said bore means in substantially circular parallel paths.

2. The arrangement as defined in claim 1 wherein said duct means has a substantially smaller cross section than said bore means.

3. The arrangement as defined in claim 1 wherein said duct means comprises a first pair of ducts spaced along one half of said bore means, and a second pair of ducts spaced along the other half of said bore means.

4. The arrangement as defined in claim 3 including inlet duct means communicating with the inlet ends of said first pair of ducts and said second pair of ducts; an outlet duct means communicating with the outlet ends of said first pair of ducts and said second pair of ducts, said inlet duct means and said outlet ducts means being substantially transverse to said pairs of ducts.

5. The arrangement as defined in claim 4 including gas inflow means communicating transversely with said inlet means; and gas outflow means communicating transversely with said outlet means, the axes of said inflow means and said outflow means being symmetrically located with respect to said first pair of ducts and said second pair of ducts.

6. The arrangement as defined in claim 3 wherein said bore means has a diameter of 8 to 15 mm and an axial length of 10 to 20 mm, said ducts each having a diameter of 1.8 to 3 mm.

7. The arrangement as defined in claim 1 wherein said duct means comprises a first set of three ducts spaced along one half of said bore means, and a second set of three ducts spaced along the other half of said bore means.

8. The arrangement as defined in claim 7 wherein said bore means has a diameter of 5 to 6 mm and an axial length of 18 to 30 mm, said ducts each having a diameter of 1.2 to 2.2 mm; and including inlet duct means communicating transversely with the inlet ends of said ducts, and outlet duct means communicating transversely with the outlet means of said ducts, said outlet duct means having a substantially larger cross sectional area than said inlet duct means.

* * * * *